United States Patent [19]

Hosoi et al.

[11] Patent Number: 5,438,871
[45] Date of Patent: Aug. 8, 1995

[54] GAS FLOW TYPE ANGULAR VELOCITY SENSOR AND METHOD OF CONSTRUCTING SAME

[75] Inventors: Takashi Hosoi; Mizuho Doi; Tomoyuki Nishio; Satoshi Hiyama, all of Saitama, Japan

[73] Assignee: Honda Giken Kogyo Kabushiki Kaisha, Tokyo, Japan

[21] Appl. No.: 889,817

[22] Filed: May 29, 1992

[30] Foreign Application Priority Data

Jun. 19, 1991 [JP] Japan ................. 3-245296

[51] Int. Cl.$^6$ .............................. G01P 9/00
[52] U.S. Cl. ................... 73/504.05; 29/595
[58] Field of Search .......... 73/505, 515, 516 LM, 73/204.22, 204.26; 338/225 D; 29/595, 621.1

[56] References Cited

U.S. PATENT DOCUMENTS

| | | | |
|---|---|---|---|
| 4,548,078 | 10/1985 | Bohrer et al. | 73/204.22 |
| 4,934,190 | 6/1990 | Lee | 73/204.26 |
| 5,107,707 | 4/1992 | Takahashi et al. | 73/516 LM |

*Primary Examiner*—John E. Chapman
*Attorney, Agent, or Firm*—Lyon & Lyon

[57] ABSTRACT

A gas flow type angular velocity sensor comprising two semiconductor substrates wherein only the first semiconductor substrate is provided with a groove etched thereon constituting the gas path and the second semiconductor substrate is provided with paired heat wires formed thereon. The two semiconductor substrates are coupled and bonded to each other to form the sensor body.

4 Claims, 5 Drawing Sheets

GAS FLOW TYPE ANGULAR VELOCITY SENSOR AND METHOD OF CONSTRUCTING SAME

BACKGROUND OF THE INVENTION

The present invention relates to a gas flow type angular velocity sensor which is capable of sensing a deflection of gas flow in a gas path of a sensor body by a pair of heat wires when an angular velocity acts on the sensor's body.

Recently, as known from Japanese laid open patent publication No. 29858/91, a gas flow type angular velocity sensor has been developed, wherein a body portion including a gas path and a pair of heat wires arranged in the gas path is manufactured by semiconductor micromachining on the basis of IC technology.

In this type angular velocity sensor, as shown in FIGS. 7, 8 and 9, the body portion is constructed in such a way that a lower semiconductor substrate 1 having an etched thereon half groove 41 and an upper semiconductor substrate 2 having an etched thereon half groove 41 are bonded to each other so as to precisely couple the half grooves 41 to form a gas path 4 in the assembled body portion.

The lower semiconductor substrate 1 has an etched therein bridge portion 6 whereon a pair of heat wires 51 and 52 are formed by patterning.

Each of the lower and upper semiconductor substrates 1 and 2 also has an etched half-hole 31 forming a nozzle hole 3 when both substrates are coupled with each other. The lower semiconductor substrate 1 has electrode portions 7 formed by patterning at both sides of paired heat wires 51 and 52.

The problem faced in the manufacture of the above-mentioned conventional device is that many micromachining operations are required for forming a half-groove 41 on each of the lower and the upper semiconductor substrates 1 and 2 and much labour is further required for precisely coupling with each other the half-grooves 41 on both substrates to form gas path 4 therein.

Another problem is that the manufacturing process involves the possibility of damaging the paired heat wires when the bridge portion 6 is formed by etching a part of the lower semiconductor substrate underneath the paired heat wires previously formed by depositing material such as platinum on the lower semiconductor substrate 1.

SUMMARY OF THE INVENTION

The present invention has been made in view of the above-mentioned problems and with its objective to provide a gas flow type angular velocity sensor wherein a body is composed of two semiconductor substrates, one having a formed thereon groove constituting a gas path and the other having only a pair of heat wires formed thereon by patterning (without forming a groove), so as to produce a high-strength structure and to reduce the steps of forming a groove in the sensor body while saving labor for positioning a gas path when assembling both substrates, thus improving the workability of said body.

Figure 1:
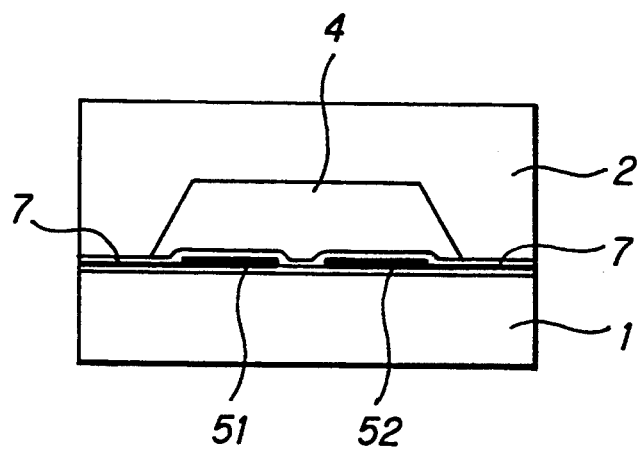
FIG. 1 is a front sectional view showing a sensor body of a gas flow type angular velocity sensor embodying the present invention.

In the drawings, 1 is a lower semiconductor substrate, 2 is an upper semiconductor substrate, 4 is a gas path, 40 is a groove forming a gas path, 51 is a heat wire, 52 is a heat wire and 7 is an electrode portion.

DESCRIPTION OF THE PREFERRED EMBODIMENTS

Figure 2:
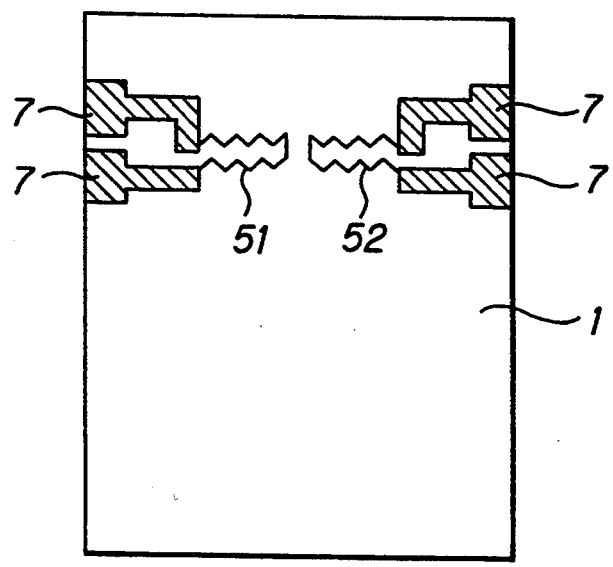
FIG. 2 is a plan view showing a lower semiconductor substrate of the sensor body.
Figure 3:
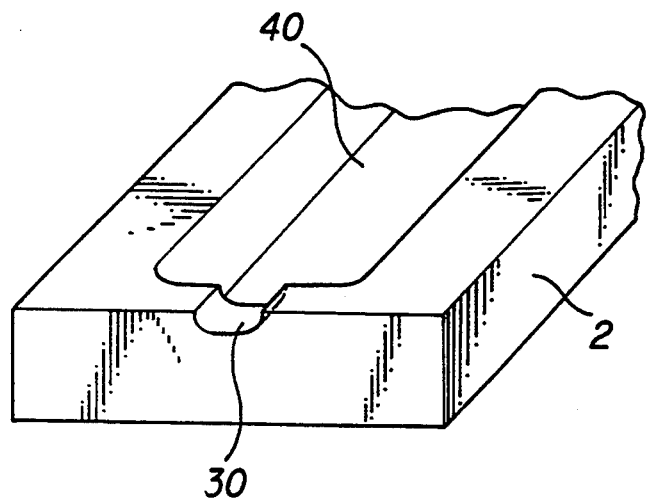
FIG. 3 is a rear side perspective view of an upper semiconductor substrate.

Referring now to the drawings, the preferred embodiments of the present invention will be described in detail as follows:

As shown in FIGS. 1-3, a gas flow type angular velocity sensor according to the present invention is so constructed that a lower semiconductor substrate 1 having a pair of heat wires 51, 52 formed thereon by patterning and an upper semiconductor substrate 2 having a groove 40 etched thereon for forming a gas path 4 are placed on, and bonded to each other to, form a sensor body having a gas path 4 including therein the paired heat wires 51 and 52.

An electrode portion 7 is formed by patterning on each side of the each of paired heat wires 51 and 52 on the lower semiconductor substrate 1.

Figure 4:
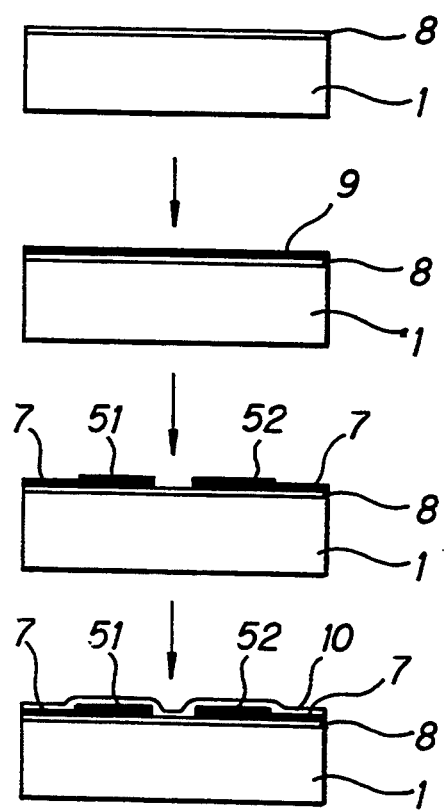
FIG. 4 is a view showing a process for forming paired heat wires and electrodes on the lower semiconductor substrate.

As shown in FIG. 4, the paired heat wires 51, 52 and the electrodes 7 can be formed on the lower semiconductor substrate 1, for instance, by forming a SiN-layer 8 on the lower semiconductor substrate 1 made of silicone (Si), by depositing a material 9 such as platinum on the SiN-layer to form the paired heat wires 51, 52 and the electrodes 7 at both sides of each of the heat wires and then by forming thereon a protective film 10 made of SiN.

A small groove 30 communicating with a groove 40 is formed integrally on the upper semiconductor substrate 2. When the upper and lower substrates are placed on, and bonded to, each other, a nozzle hole for forcing gas into the gas path is formed between the small groove 30 and the lower semiconductor substrate 1.

In the gas flow type angular velocity sensor having a constructed sensor body, gas is forced by a miniature pump (not shown) into the gas path 4 through the nozzle hole of the sensor body and laminarly flows therealong. When a deflection of the gas flow in the gas path 4 of the sensor body is caused by the action of an angular velocity applied to the gas flow, it can be detected electrically by a change of differential resistance in the paired heat wires 51 and 52.

In practice, a bridge circuit composed of a standard resistance and the heat wires 51, 52 has an output which is amplified by an amplifier as a signal of the detected angular velocity.

By a sensor body according to the present invention, wherein a gas path 4 can be formed by a groove 40 made by an etching method only on the upper semiconductor substrate 2 and the upper and the lower semiconductor substrates 1 and 2 are simply coupled and bonded to each other, as compared with the aforementioned conventional sensor body wherein the gas path is formed by two half-grooves made by an etching method on both the upper and the lower semiconductor substrates, it is possible to reduce the groove forming steps and save labor required for positioning the gas path in the sensor body at the time of assembling the substrates, thereby making it easier to manufacture and assemble the sensor body.

According to the present invention, since a pair of heat wires 51, 52 are formed only by patterning on the lower semiconductor substrate 1 without any etching under the paired heat wires, the sensor body may have a structure of increased strength and therefore the heat wires may not be damaged by stress.

Figure 5:
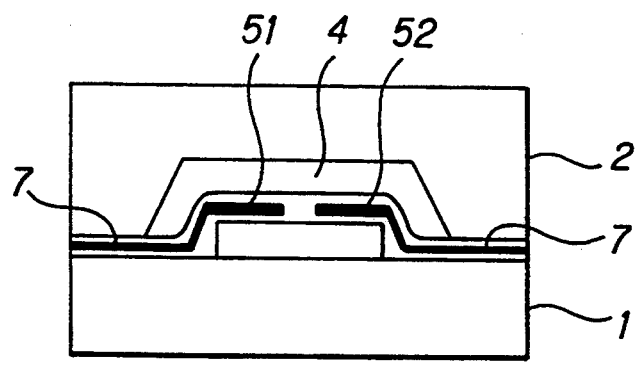
FIG. 5 is a front sectional view showing a sensor body of another embodiment of the present invention.

FIG. 5 shows another embodiment of the present invention, wherein a pair of heat wires 51, 52 are formed in the form of a bridge built over the top surface of a lower semiconductor substrate 1 and arranged in substantially the middle of the cross-section of a gas path 4 so as to increase the sensitivity of detecting a degree of gas flow deflection.

In contrast, if a pair of heat wires 51, 52 are formed on lower semiconductor substrate 1 constituting a wall surface of a gas path as shown in FIG. 4, gas flow along the wall surface may be reduced, resulting in lowering of the sensitivity of the gas flow deflection sensor.

Figure 6:
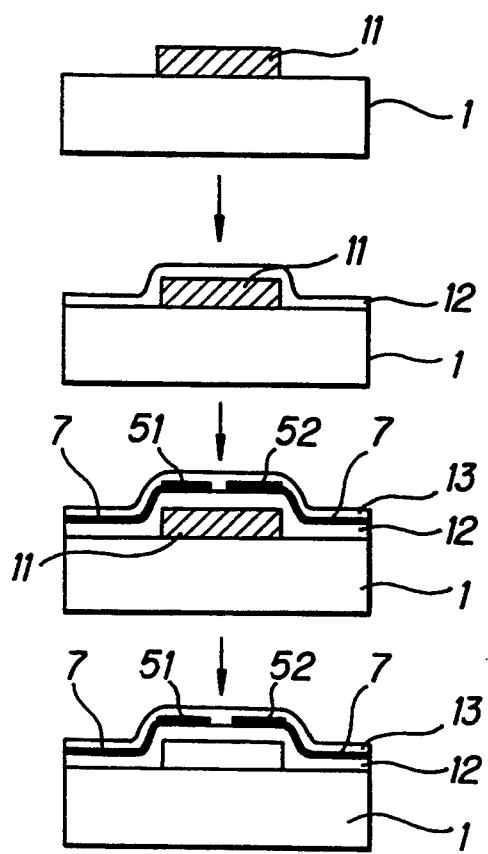
FIG. 6 is a view showing a process for forming a pair of heat wires in the form of a bridge over a lower semiconductor substrate.
Figure 7:
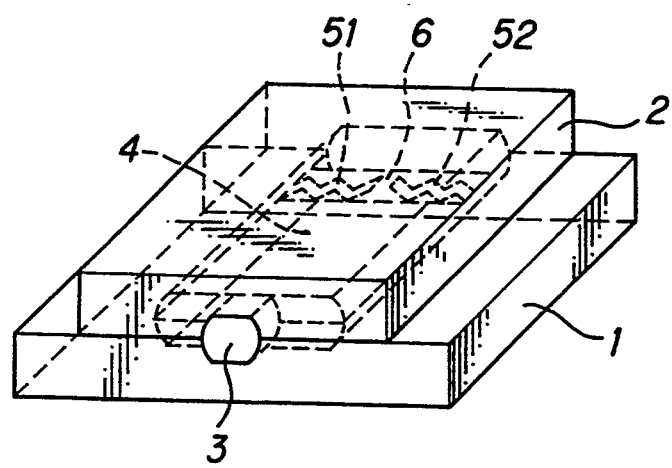
FIG. 7 is a perspective view showing a sensor body of a conventional gas flow type angular velocity sensor.
Figure 8:
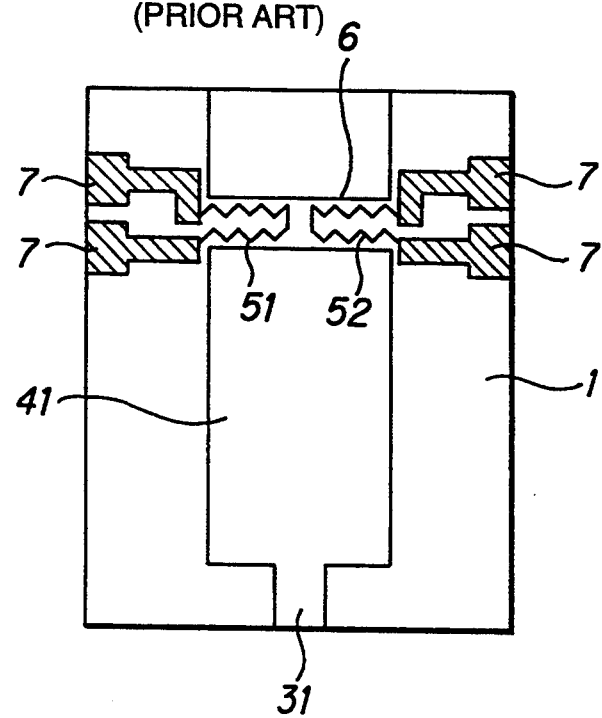
FIG. 8 is a plan view showing a low semiconductor substrate of the conventional sensor body.
Figure 9:
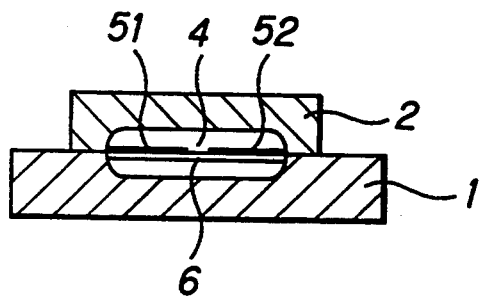
FIG. 9 is a front sectional view showing the conventional sensor body.

As illustrated in FIG. 6, a bridge of the paired heat wires may be constructed over the top surface of the lower semiconductor substrate 1 in the following manner: A sacrificing layer 11 made of PSG or $SiO_2$ is formed by photoetching on a lower semiconductor substrate 1 made of silicone (Si). A film 12 of SiN is formed on the sacrificing layer 11. A heat wire material such as platinum is deposited on the SiN-film 12 and formed in a given pattern of paired heat wires 51 and 52 by etching. An electrode 7 is formed at each side of the paired heat wires 51 and 52. A protective SiN-film 13 is formed on the heat wire 51, 52 and electrodes 7, and then the sacrificing layer 11 is removed with an etchant of hydrofluoric acid.

The gas flow type angular velocity sensor according to the present invention, which body includes a pair of heat wires in a gas path formed therein, is manufactured by adhesively assembling two semiconductor substrates, one having the groove constituting the gas path and the other having only the paired heat wires formed thereon by pattern etching (without forming a groove), has the advantages that the body may have effectively simplified structure of improved strength and be readily manufactured and easily assembled because of saving a number of manufacturing steps for forming a groove and omitting laborious positioning work when assembling the components.

What is claimed is:

1. In a gas flow type angular velocity sensor, of the type for detecting an angular velocity from a change of resistance in each of paired heat wires having temperature-sensitive resistance, when a flow of gas forced into a gas path in a sensor body through a nozzle hole and directed toward the pair of heat wires is deflected by the action of an angular velocity on the sensor body, the improvement comprising:

a first semiconductor substrate having a gas path groove formed thereon;

a second semiconductor substrate having a substantially flat surface; and each of said heat wires of the pair of heat wires having a first portion mounted on said substantially flat surface and a second portion extending toward the other said heat wire of said pair of heat wires, said second portions of said pair of heat wires being spaced from a portion of said substantially flat surface for forming a single bridge shape over said portion of .said substantially flat surface of said second semiconductor substrate, wherein said first and second semiconductor substrates are bonded to each other to form the sensor body, with said gas path groove of said first semiconductor substrate positioned adjacent to essayed substantially flat surface of said second semiconductor substrate, and said pair of heat wires extending into said gas path groove.

2. The gas flow type angular velocity sensor of claim 1, wherein said single bridge shape of said pair of heat wires extends approximately midway into said gas flow groove.

3. A method of constructing a gas flow type angular velocity sensor, comprising the steps of:

(a) forming a gas path groove in a surface of a first semiconductor substrate;

(b) forming a pair of heat wires on a substantially flat surface of a second semiconductor substrate each with said heat wire having a first portion formed on the substantially flat surface and a second portion formed in the shape of a single bridge extending above and spaced from a portion of the substantially flat surface; and (c) bonding the first and second semiconductor substrates together to form a sensor body, with the gas path groove of the first semiconductor substrate positioned adjacent to the substantially flat surface of the second semiconductor substrate the pair of heat wires extending into the gas path groove.

4. A method of constructing a gas flow type angular velocity sensor, according to claim 3, comprising the further steps of:

forming a sacrificing layer on said portion of the substantially flat surface of the second semiconductor substrate before said step of forming said pair of heat wires on the substantially flat surface of the second semiconductor substrate, with said second portion of each said heat wire formed on the sacrificing layer; and removing the sacrificing layer after said step of forming said pair of heat wires so that said second portion of each said heat wire forms a portion of said single bridge.

* * * * *